(12) United States Patent
Beck et al.

(10) Patent No.: US 8,005,094 B2
(45) Date of Patent: Aug. 23, 2011

(54) METHOD AND APPARATUS FOR CIRCUIT EMULATION SERVICES OVER CELL AND PACKET NETWORKS

(75) Inventors: Juergen Beck, Hohenkammer (DE);
Mark A. Bordogna, Andover, MA (US);
Christopher W. Hamilton, Breinigsville, PA (US)

(73) Assignee: Agere Systems Inc., Allentown, PA (US)

( * ) Notice: Subject to any disclaimer, the term of this patent is extended or adjusted under 35 U.S.C. 154(b) by 1141 days.

(21) Appl. No.: 11/480,320

(22) Filed: Jun. 30, 2006

(65) Prior Publication Data

US 2008/0002738 A1    Jan. 3, 2008

(51) Int. Cl.
*H04L 12/28* (2006.01)
(52) U.S. Cl. .................. 370/395.5; 370/395.61
(58) Field of Classification Search .............. 370/389, 370/395.1, 395.43, 395.53, 395.6, 395.62, 370/400, 401, 465, 466, 395.5, 395.61
See application file for complete search history.

(56) References Cited

U.S. PATENT DOCUMENTS

| | | | |
|---|---|---|---|
| 5,420,858 A * | 5/1995 | Marshall et al. | 370/352 |
| 6,094,432 A * | 7/2000 | Jeong | 370/395.7 |
| 6,526,057 B1 * | 2/2003 | Lee | 370/395.42 |
| 6,795,431 B2 * | 9/2004 | Endo | 370/352 |
| 6,870,837 B2 * | 3/2005 | Ho et al. | 370/356 |
| 6,944,182 B1 * | 9/2005 | Amagai et al. | 370/466 |
| 7,184,440 B1 * | 2/2007 | Sterne et al. | 370/395.52 |
| 2006/0050743 A1 * | 3/2006 | Black et al. | 370/516 |

OTHER PUBLICATIONS

Y Stein et al., "TDM Over IP," Internet Engineering Task Force (IETF), draft-ietf-pwe3-tdmoip-03.txt (Feb. 27, 2005).
ATM Forum Specification, atm-vtoa-0078 (CES 2.0) (Jan. 1997).

\* cited by examiner

*Primary Examiner* — Hong Cho
(74) *Attorney, Agent, or Firm* — Ryan, Mason & Lewis, LLP

(57) ABSTRACT

Methods and apparatus are provided for circuit emulation services over cell and packet networks. A constant bit rate traffic stream is mapped to one of a cell and packet structure. The constant bit rate traffic stream is mapped to one or more cells and the one or more cells are selectively translated to one or more packets if a packet stream is selected. In addition, one of a received cell and packet stream are mapped to a constant bit rate traffic stream. The packet stream is selectively translated to one or more cells and the one or more cells are translated to the constant bit rate traffic stream. A clock can optionally be recovered from the received cell or packet stream.

24 Claims, 3 Drawing Sheets

METHOD AND APPARATUS FOR CIRCUIT EMULATION SERVICES OVER CELL AND PACKET NETWORKS

FIELD OF THE INVENTION

The present invention relates generally to communication systems, and more particularly, to techniques for providing circuit emulated services over packet and cell networks.

BACKGROUND OF THE INVENTION

In an increasingly heterogeneous network environment, it is often necessary to map circuit emulated services (CES), such as T1/E1 private line services, to a cell or packet infrastructure, such as an Asynchronous Transfer Mode (ATM) or Internet Protocol (IP) network environment, respectively. A number of techniques have been proposed or suggested for mapping CES to cells or packets. Typically, independent hardware is employed to map CES to a cell structure (such as associated with an ATM network) and to map CES to a packet structure (such as associated with an IP network). While such independent circuits effectively map CES to cells and packets, this independent approach results in increased power dissipation, additional logic design and a larger surface area Constant Bit Rate (CBR) services have been employed to emulate leased lines. Since ATM networks generally employ cells and IP networks generally employ packets, as opposed to a circuit-based transmission technology, circuit characteristics must be emulated in these networks in order to support CBR traffic. The need for circuit emulation within ATM and/or IP networks reflects an increasing demand for carrying CBR traffic over such networks. "Circuit Emulation Service Interoperability Specification, Version 2.0," ATM Forum Specification, atm-vtoa-0078 (CES 2.0) (January, 1997), describes the use of an ATM Adaptation Layer 1 (AAL1) format for circuit emulation over ATM. Y Stein et al., "TDM Over IP," Internet Engineering Task Force (IETF), draft-ietf-pwe3-tdmoip-03.txt (Feb. 27, 2005), describe a technique for transmitting N ATM AAL1 payloads per packet over an IP network to achieve circuit emulation over IP networks.

A need exists for methods and apparatus for simultaneous support of Circuit Emulated Services over a cell infrastructure or over a packet infrastructure. A further need exists for methods and apparatus for simultaneous support of Circuit Emulated Services using a mapping/demapping function between ATM cells and packets. Yet another need exists for methods and apparatus for simultaneous support of Circuit Emulated Services using shared hardware for one or more of cell/packet translation, dejitter buffering and clock recovery. In addition, a need exists for multiple services over a packet switched network with a common management approach

SUMMARY OF THE INVENTION

Generally, methods and apparatus are provided for circuit emulation services over cell and packet networks. According to one aspect of the invention, a constant bit rate traffic stream is mapped to one of a cell and packet structure. The constant bit rate traffic stream is mapped to one or more cells and the one or more cells are selectively translated to one or more packets if a packet stream is selected. The constant bit rate traffic stream can be associated with, for example, a T1/E1 circuit connection. The cell structure can be associated with, for example, an ATM network and the packet structure can be associated with, for example, one or more of an IP network and an Ethernet network.

According to one aspect of the invention, one of a received cell and packet stream are mapped to a constant bit rate traffic stream. The packet stream is selectively translated to one or more cells and the one or more cells are translated to the constant bit rate traffic stream. A clock can optionally be recovered from the received cell or packet stream. In one exemplary implementation, one or more of the clock recovery, translation and buffer storage are performed using the same hardware for the received cell and packet streams.

A more complete understanding of the present invention, as well as further features and advantages of the present invention, will be obtained by reference to the following detailed description and drawings.

DETAILED DESCRIPTION

The present invention provides simultaneous support for CES over ATM and CES over packets. According to one aspect of the invention, a mapping/demapping algorithm is disclosed that translates between ATM cells and packets. According to a further aspect of the invention, simultaneous support of Circuit Emulated Services is provided using shared hardware for one or more of cell/packet translation, dejitter buffering and clock recovery. While the present invention is illustrated in the context of mapping a constant bit rate (CBR) T1/E1 stream to cells or packets, the present invention can be applied to any constant bit rate stream, as would be apparent to a person of ordinary skill in the art.

Figure 1:
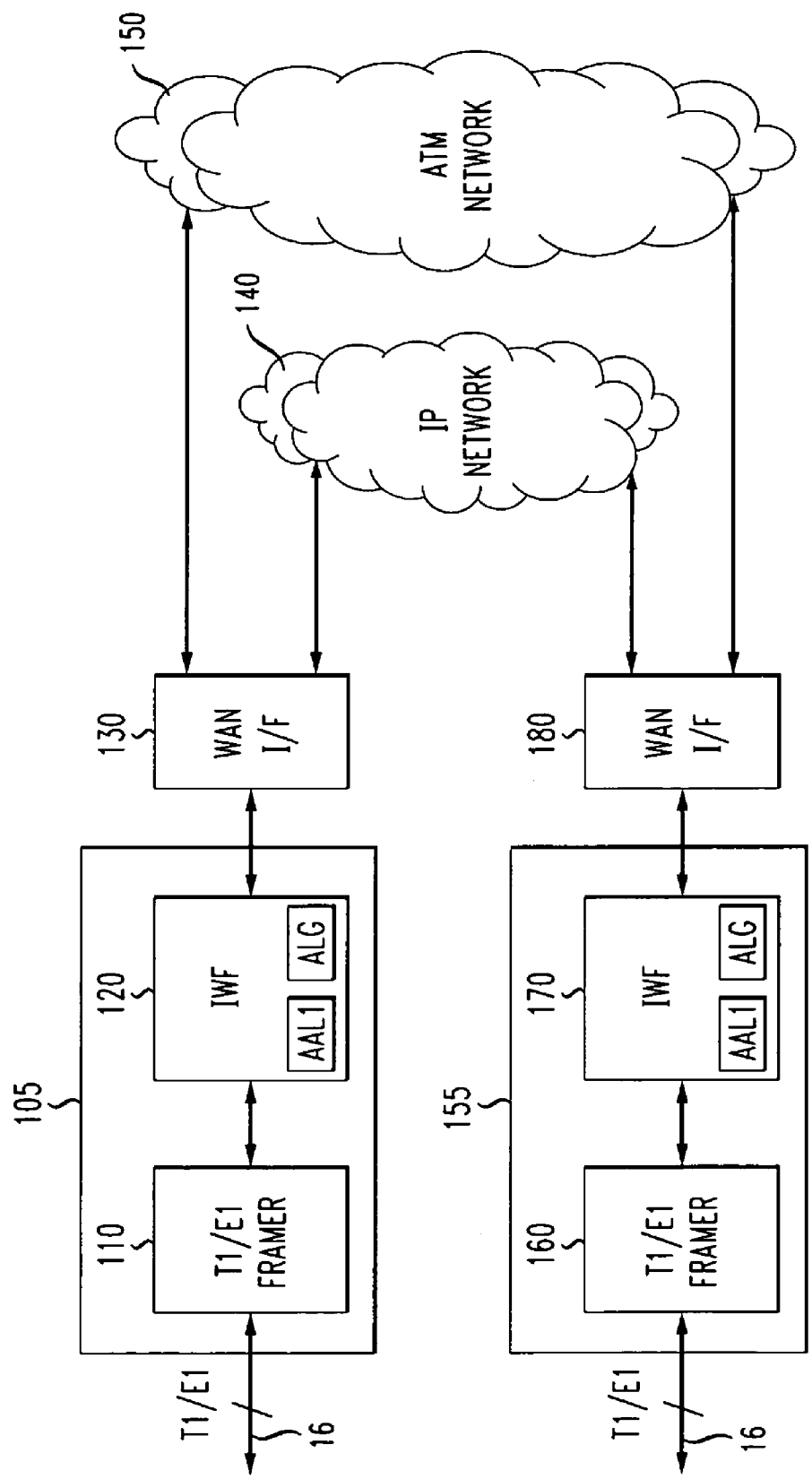
FIG. 1 illustrates a communication system incorporating features of the present invention.

FIG. 1 illustrates a communication system 100 incorporating features of the present invention. As shown in FIG. 1, an ingress gateway node 105 communicates with an egress gateway node 155 over one or more networks, such as an IP network 140 and an ATM network 150. The exemplary ingress gateway node 105 comprises a T1/E1 framer 110 and an interworking function (IWF) 120. The T1/E1 framer 110 receives a CBR stream over T1/E1 circuits, identifies the start of each frame and generates circuit traffic with a frame start indicator, in a known manner.

The T1 frame delineated circuit traffic is then processed by the IWF 120. Generally, the IWF 120 is a network processor. According to one aspect of the invention, the IWF 120 processes the CBR circuit traffic and generates either cells or packets. As shown in FIG. 1, the exemplary IWF 120 comprises an AAL1 stage that maps the CBR circuit traffic (T1 frames) to, for example, 53 byte ATM cells (such as a 48 byte payload and a five byte header). Thereafter, an exemplary mapping algorithm (ALG) selectively generates ATM cells or packets, as discussed further below in conjunction with FIG. 3. The packets are generally variable sized packets, such as IP or Ethernet packets in a Structured Agnostic Transport over Packet (SAToP) format. The cells or packets generated by the IWF 120 are processed by a Wide Area Network Interface (WAN I/F) 130 and transmitted on, for example, an ATM network 140 for cells, or an IP network 150 for packets.

The exemplary egress gateway node 155 comprises a T1/E1 framer 160 and an IWF 170. A WAN I/F 180 receives cells from the exemplary ATM network 140, or packets from the exemplary IP network 150 and applies the received cells or packets to the IWF 170. As shown in FIG. 1, the exemplary IWF 170 comprises an exemplary demapping algorithm (ALG) that selectively translates the ATM cells or packets to cells. An AAL1 stage maps the ATM cells to CBR circuit traffic (T1 frames). The T1/E1 framer 160 processes the CBR stream for transmission over the T1/E1 circuits, in a known manner.

Figure 2A:
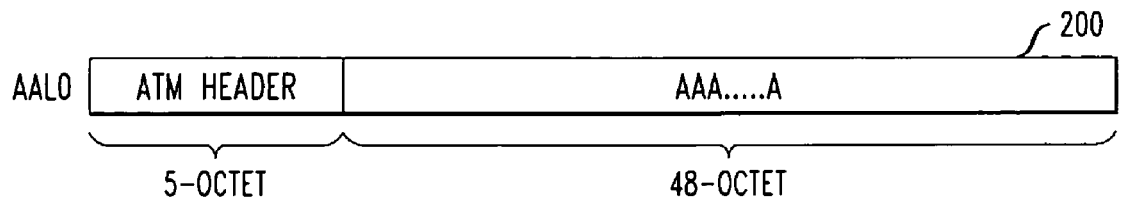
FIGS. 2A and 2B illustrate exemplary 53 byte ATM cell formats that may be employed for the ATM circuit emulation.
Figure 2B:
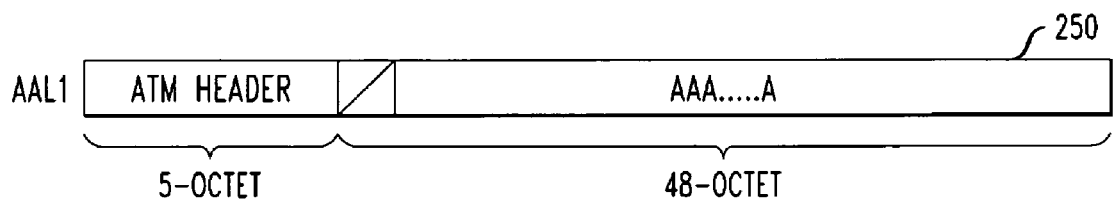

FIGS. 2A and 2B illustrate exemplary 53 byte ATM cell formats 200, 250 that may be employed for the ATM circuit emulation. As shown in FIGS. 2A and 2B, both exemplary ATM cell formats 200, 250 comprise a 5 byte (i.e., octet) header and a 48 byte payload. In a first exemplary ATM cell format mode 200 (AAL0), shown in FIG. 2A, all 48 bytes of the payload are used to transport T1/E1 data. In a second exemplary ATM cell format mode 250 (AAL1), shown in FIG. 2B, 47 bytes of the payload are used to transport T1/E1 data and one byte is used for timestamps and sequence numbers, in a known manner. The AAL1 format is used in the ATM examples described herein.

Packet circuit emulation, as in a SAToP approach, relies upon mapping T1/E1 circuits to a fixed packet payload. Exemplary fixed payload sizes include 192 bytes, 188 bytes and, 96 bytes. Typical packet circuit emulation approaches use fixed length payloads (as opposed to asynchronous oriented data services which use variable sized payload containers).

Figure 3:
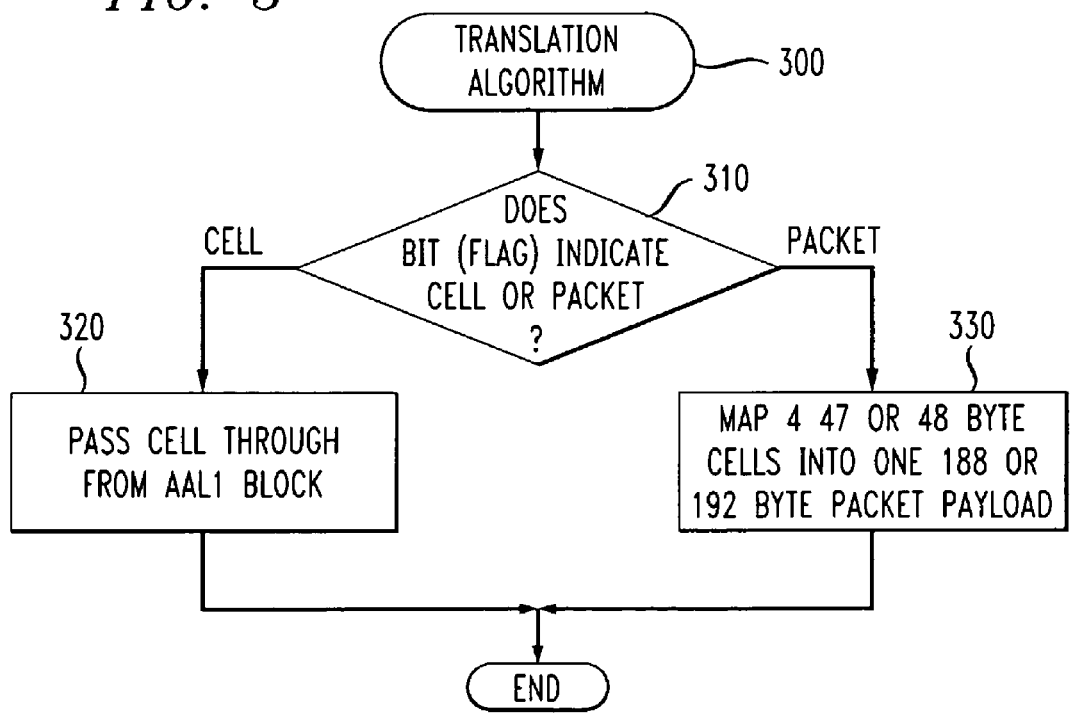
FIG. 3 is a flow chart describing an exemplary implementation of a translation algorithm that may be implemented by the ALG block in the IWF of FIG. 1.

FIG. 3 is a flow chart describing an exemplary implementation of a translation algorithm 300 that may be implemented by the ALG block in the IWF 120 of FIG. 1. Generally, the translation algorithm 300 translates between ATM CES (cell to cell) and packet CES (cell to packet). In an exemplary implementation, the translation algorithm 300 initially accesses a flag associated with the T1 circuit during step 310, such as a bit setting in a header, to determine if the bit control indicates that the CES is being performed over an ATM or packet network.

If CES over ATM is desired, then the cell from the AAL1 block is passed through by the translation algorithm 300 during step 320. If, however, CES over packet is desired, then four cells from the AAL1 block are translated into one packet during step 330. In particular, in one exemplary AAL1 implementation, the 47 byte payload from four cells are mapped into one 188 byte payload for a packet (e.g., an AAL1 to SAToP translation). In an exemplary AAL0 implementation, the 48 byte payload from four cells are mapped into one 192 byte payload for a packet. It is noted that additional overhead changes may be necessary, but are outside the scope of the present invention. For example, a sequence number, length, and launch and recovery (L/R) bits may be added.

On an egress path, the demapping algorithm in the IWF 170 performs the inverse function of the translation algorithm 300. For example, for an exemplary AAL1 implementation, the 188 byte payload for a packet is mapped into four 47 byte cells. In an exemplary AAL0 implementation, the 192 byte payload for a packet is mapped into four 48 byte cells. It is noted that additional overhead changes may be necessary, but are outside the scope of the present invention. For example, a sequence number (16 bits), channel state information (CSI), cyclic redundancy check (CRC), and high priority (HP) bits may be added.

Figure 4:
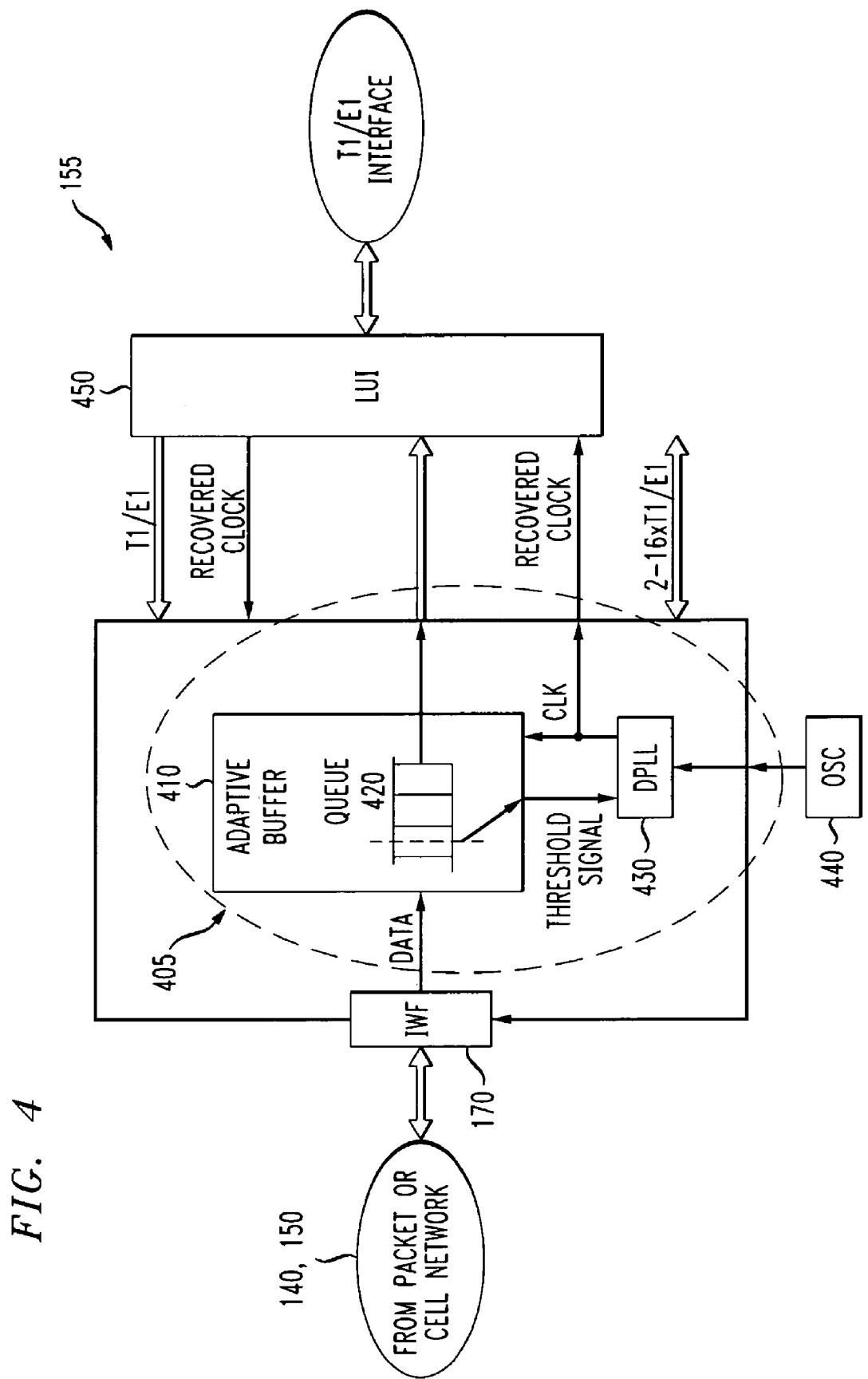
FIG. 4 illustrates the exemplary egress gateway node of FIG. 1 in further detail.

FIG. 4 illustrates the exemplary egress gateway node 155 of FIG. 1 in further detail. As shown in FIG. 4, information is received from the packet or cell networks 140, 150 and is processed by the IWF 170. According to one aspect of the invention, a clock recovery operation 405 is performed to recover the clock needed for the T1/E1 circuits. In one exemplary implementation, an adaptive buffer 410 having a queue 420 is used to store the received data. The dejitter buffer 410 absorbs packet/cell delay variations across the network. The received cells and packets are placed by the IWF 170 in the queue 420. The clock recovery circuit 405 monitors the level of the queue to generate the recovered clock. In particular, as the level of the data in the queue 420 exceeds a desired threshold, the speed of a clock signal, clk, generated by a digital phase locked loop (DPLL) 430 and an oscillator 440 is increased, and as the level of the data in the queue 420 falls below a desired threshold, the clock speed is decreased. The data is then provided from the queue 420 to a line interface unit (LIU) 450 with the recovered clock.

According to a further aspect of the invention, simultaneous support of Circuit Emulated Services is provided using shared hardware for one or more of cell/packet translation, dejitter buffering and clock recovery. As previously indicated, the IWF 170 includes a translation algorithm 300 that translates between cells and packets. In this manner, the IWF 170 provides a mapping function from the circuit domain to the cell/packet domain. By using the mapping algorithm that maps/demaps from ATM cells to packets, the hardware design can have a single instance of a dejitter buffer and a single instance of a clock recovery block. Thus, as shown in FIG. 4, the same dejitter buffer 410 and clock recovery circuit 405 are used for both CES over packets and CES over cells.

While FIG. 3 shows an exemplary sequence of steps, it is also an embodiment of the present invention that the sequence may be varied. Various permutations of the algorithm are contemplated as alternate embodiments of the invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for mapping a constant bit rate traffic stream to one of a cell and packet structure, comprising:
   translating said constant bit rate traffic stream to one or more cells; and
   selectively translating said one or more cells to one or more packets if a packet stream is selected, wherein said translating steps utilize a single shared dejitter buffer.

2. The method of claim 1, wherein said constant bit rate traffic stream is associated with a T1/E1 circuit connection.

3. The method of claim 1, wherein said cell structure is associated with an ATM network.

4. The method of claim 1, wherein said packet structure is associated with one or more of an IP network or an Ethernet network.

5. The method of claim 1, wherein said packet stream is selected if a flag associated with said constant bit rate traffic stream has been set to a predefined value.

6. A method for mapping one of a received cell and packet stream to a constant bit rate traffic stream, comprising:
   selectively translating a packet stream to one or more cells; and
   translating said one or more cells to said constant bit rate traffic stream, wherein said translating steps utilize a single shared dejitter buffer.

7. The method of claim 6, further comprising the step of recovering a clock from said received cell or packet stream.

8. The method of claim 7, wherein said step of recovering a clock uses the same hardware for said received cell and packet streams.

9. The method of claim 6, further comprising the step of storing said received cell or packet stream in a buffer.

10. The method of claim 9, wherein said step of storing uses the same hardware for said received cell and packet streams.

11. The method of claim 6, wherein said translating steps use the same hardware for said received cell and packet streams.

12. The method of claim 6, wherein said selective translating step is enabled if a flag associated with said constant bit rate traffic stream has been set to a predefined value.

13. An apparatus for mapping a constant bit rate traffic stream to one of a cell and packet structure, comprising:
   a memory; and
   at least one processor, coupled to the memory, operative to:
   translate said constant bit rate traffic stream to one or more cells; and
   selectively translate said one or more cells to one or more packets if a packet stream is selected, wherein said translating steps utilize a single shared dejitter buffer.

14. The apparatus of claim 13, wherein said constant bit rate traffic stream is associated with a T1/E1 circuit connection.

15. The apparatus of claim 13, wherein said cell structure is associated with an ATM network.

16. The apparatus of claim 13, wherein said packet structure is associated with one or more of an IP network or an Ethernet network.

17. The apparatus of claim 13, wherein said packet stream is selected if a flag associated with said constant bit rate traffic stream has been set to a predefined value.

18. An apparatus for mapping one of a received cell and packet stream to a constant bit rate traffic stream, comprising:
   a memory; and
   at least one processor, coupled to the memory, operative to:
   selectively translate a packet stream to one or more cells; and
   translate said one or more cells to said constant bit rate traffic stream, wherein said translating steps utilize a single shared dejitter buffer.

19. The apparatus of claim 18, wherein said processor is further configured to recover a clock from said received cell or packet stream.

20. The apparatus of claim 19, wherein said clock recovery uses the same hardware for said received cell and packet streams.

21. The apparatus of claim 18, wherein said processor is further configured to store said received cell or packet stream in a buffer.

22. The apparatus of claim 21, wherein said received cell or packet stream are stored in said buffer using the same hardware for said received cell and packet streams.

23. The apparatus of claim 18, wherein said translations use the same hardware for said received cell and packet streams.

24. The apparatus of claim 18, wherein said selective translation is enabled if a flag associated with said constant bit rate traffic stream has been set to a predefined value.

* * * * *